United States Patent [19]
Ludden

[11] Patent Number: 5,245,398
[45] Date of Patent: Sep. 14, 1993

[54] TIME-MULTIPLEXED MULTI-ZONE RANGEFINDER

[75] Inventor: Christopher A. Ludden, Fairport, N.Y.

[73] Assignee: Eastman Kodak Company, Rochester, N.Y.

[21] Appl. No.: 719,181

[22] Filed: Jun. 21, 1991

[51] Int. Cl.$^5$ .................. G01C 3/00; G01C 5/00; G03B 3/00
[52] U.S. Cl. .................... 356/1; 250/201.6; 354/403
[58] Field of Search .............. 356/1; 354/403; 250/201.6

[56] References Cited

U.S. PATENT DOCUMENTS

| | | | |
|---|---|---|---|
| Re. 32,886 | 3/1989 | Stauffer | 250/201 |
| 4,047,187 | 9/1977 | Mashimo et al. | 354/23 |
| 4,221,474 | 9/1980 | Lermann et al. | 354/23 |
| 4,252,425 | 2/1981 | Aoki et al. | 354/25 |
| 4,283,137 | 8/1981 | Tsunekawa et al. | 356/4 |
| 4,291,223 | 9/1981 | Sakane et al. | 250/201 |
| 4,317,991 | 3/1982 | Stauffer | 250/201 |
| 4,367,027 | 1/1983 | Stauffer | 354/195 |
| 4,490,037 | 12/1984 | Anagnostopoulos et al. | 356/1 |
| 4,508,963 | 4/1985 | Wilwerding et al. | 250/201 |
| 4,521,106 | 6/1985 | Lambeth | 356/1 |
| 4,522,492 | 6/1985 | Masunaga | 356/1 |
| 4,527,891 | 7/1985 | Lambeth | 356/1 |
| 4,529,304 | 7/1985 | Ogawa et al. | 356/1 |
| 4,534,636 | 8/1985 | Sugawara | 354/403 |
| 4,575,237 | 3/1986 | Suzuki | 356/1 |
| 4,582,424 | 4/1986 | Kawabata | 356/1 |
| 4,636,053 | 1/1987 | Sakane et al. | 354/403 |
| 4,640,613 | 2/1987 | Yokoyama et al. | 356/1 |
| 4,648,700 | 3/1987 | Nagaoka | 354/403 |
| 4,668,084 | 5/1987 | Suzuki et al. | 356/1 |
| 4,674,855 | 6/1987 | Utagawa | 354/403 |
| 4,681,432 | 7/1987 | Kawabata et al. | 356/4 |
| 4,688,919 | 8/1987 | Ogawa et al. | 354/403 |
| 4,716,430 | 12/1987 | Stauffer | 354/403 |
| 4,723,073 | 2/1988 | Amikura et al. | 250/201 |
| 4,827,301 | 5/1989 | Matsui et al. | 354/403 |

*Primary Examiner*—Stephen C. Buczinski
*Attorney, Agent, or Firm*—David Hall

[57] ABSTRACT

A low cost, reflectivity insensitive rangefinder for performing time-multiplexed multi-zone auto-ranging comprises a light projecting means energizable for projecting a beam of light to illuminate a spot on an object in a scene. A linear array of N photosensitive elements views the scene and produces N photosignals representing the brightness of the scene, wherein each photosensitive element corresponds to one of N discrete subject distance zones, in sequence, from a far zone to a near zone. A control signal generating means generates process control signals for initiating intermediate zone ranging operations. A selection signal supply means supplies selection signals for effectuating a time-multiplexed multi-zone ranging operation. An analog multiplexer means, responsive to the selection signals, inputs the N photosignals, in parallel, and outputs selected time-multiplexed pairs of photosignals. Each pair of photosignals represents, in sequence, the scene brightness of an intermediate FAR zone and an intermediate NEAR zone. Signal processing electronics responsive to the pairs of photosignals and responsive to the process control signals periodically energizes the light projecting means and produces N-1 intermediate FAR/NEAR zone determinations. A final subject distance selection means selects a final subject distance zone from the intermediate zone determinations.

3 Claims, 4 Drawing Sheets

TIME-MULTIPLEXED MULTI-ZONE RANGEFINDER

BACKGROUND OF THE INVENTION

1. Field of the Invention

The present invention relates to automatic rangefinder devices and, more particularly, to rangefinders of the multi-zone, active, triangulation type wherein a beam of light is projected on a scene to illuminate a spot on an object, and an array of photosensor elements sense the location of the spot in an image of the scene. The output signals of the photosensor elements are multiplexed for determining the distance to the object in the scene.

2. Description of the Related Art

In one type of automatic rangefinder, a beam of light is projected upon an object in a scene to form an illuminated spot on the object. An image of the scene, including the illuminated spot, is formed on a linear image sensor. The location of the illuminated spot along the image sensor is determined by the distance to the object in the scene. Such a rangefinding device finds application for example in an automatic focusing camera.

The general arrangement of elements and mode of operation of such a rangefinding device will be described with reference to FIG. 1. Means for projecting a beam of light is shown by way of example as an infrared emitting diode (IRED) 10 and a lens 12. The beam is projected along a path 14 to illuminate a spot on an object $O_1$ in a scene. The scene is imaged by a second lens 16 onto an image sensor comprising a linear array of photosensors 18. The signals produced by the photosensors are analyzed by control electronics 20 to determine the position of the illuminated spot in the scene and produce a signal representing the distance to the object.

As shown by example in FIG. 1, the apparent position of the illuminated spot in the scene is a function of distance along light path 14 to the object. For an object $O_1$ located at a distance $D_1$ from the rangefinding device, the image of the illuminated spot will fall on the image sensor at location $S_1$. For an object $O_2$ located at a further distance $D_2$, the image of the spot will fall on the image sensor at location $S_2$. By examining the output of the image sensor, the control electronics determines (for example, by comparing the outputs of the elements to determine that output which is a maximum) the location of the illuminated spot in the scene and thereby the distance to the object.

In U.S. Pat. No. 4,575,237, issued Mar. 11, 1986, a rangefinding device for measuring the distance to an object is disclosed. In particular, the '237 device is arranged to continuously measure the distance to the object by processing the signals obtained through a plurality of detectors. The output signal of each detector is compared to all other detector outputs and the control circuit computes a peak value. A disadvantage of such a rangefinder is the extra expense of the comparison and computational circuitry required to implement such a rangefinder. This would be undesirable in a low cost rangefinder application.

In U.S. Pat. No. 4,221,474, issued Sep. 9, 1980, a focussing system which time-multiplexes the signals from two photodiodes is disclosed. The '474 focussing system employs optics which transversely shifts in dependence upon exposure-objective subject-distance settings, onto one, the other or both of the two photodiodes for changing the field of view of each photodiode while determining focus adjustment. The signals of the photodiodes are routed to a peak detection signal processing stage employing amplitude comparison of the photodiode signals with a reference voltage. Use of the amplitude comparison makes the device susceptible to undesirable performance (i.e., variations in zone crossover point locations) caused by variations in object reflectivity. Another disadvantage of this system is that it requires movement of its optical components, making it complex and requiring numerous components. Such a system is undesirable for implementation in a simple, low cost rangefinder device.

In U.S. Pat. No. 4,534,636, issued Aug. 13, 1985, an automatic focusing device for a camera is disclosed. The focusing device includes a rangefinder section having an array of detector elements and a logic circuit for detecting the closest object in a photographing field. The rangefinder section further includes amplitude comparison circuitry for each detector in which a reference voltage is compared with each detector signal. A disadvantage of such a device is that duplicate comparison circuitry is employed, thus adding to the expense of manufacturing the same. In addition, as a result of reference voltage comparisons with detector signals, the '636 device performance can be undesirably affected by variations in the reflectivity of the main object. The expense of duplicate circuitry and sensitivity to object reflectivity are undesirable in a low cost, reflectivity insensitive rangefinder.

In U.S. Pat. No. 4,527,891, issued Jul. 9, 1985, a rangefinder device having serial readout of a linear image sensor via a charge-coupled device shift register and a peak detector is disclosed. A disadvantage of the '891 rangefinder is the high cost of the charge-coupled device and associated electronics, resulting in a high total cost to manufacture and use the same. This is undesirable in a low cost rangefinder device.

In U.S. Pat. No. 4,582,424, issued Apr. 15, 1986, a distance measuring apparatus is disclosed. The '424 apparatus requires a plurality of light-emitting units and a plurality of light-receiving units to effectuate a ranging operation. A disadvantage of the '424 apparatus is the requirement of a plurality of light-emitting units to view different areas of the scene. This adds expense to the manufacture and use of such a rangefinder. The '424 apparatus further suffers in that it utilizes amplitude comparisons of the detector output signals to a threshold reference voltage. As a result, the apparatus is susceptible to undesirable operation due to variations in object reflectivity. These disadvantages are undesirable in a low cost, high performance (i.e., reflectivity insensitive) rangefinder.

It would thus be desirable to provide a multiple zone rangefinder which is low cost and reflectivity insensitive.

OBJECTS OF THE INVENTION

An object of the present invention is to provide a low cost, multi-zone rangefinder device.

Another object of the present invention is to provide a reflectivity insensitive multi-zone rangefinder device.

SUMMARY OF THE INVENTION

According to the invention, a rangefinder device comprises a time-multiplexed multi-zone device, multizone corresponding to more than two subject distance zones. The rangefinder device comprises an energizable means for projecting a beam of light to illuminate a spot on an object in a scene. A linear array of N photosensitive elements views the scene and produces N photosignals representing the brightness of the scene, wherein each photosensitive element corresponds to one of N discrete subject distance zones, in sequence, from a far zone to a near zone. A control signal generating means generates process control signals for initiating intermediate zone ranging operations. A selection signal supply means supplies selection signals for effectuating a time-multiplexed multi-zone operation. An analog multiplexer means, responsive to the selection signals, inputs the N photosignals, in parallel, and outputs selected time-multiplexed groups of photosignals. Each group of photosignals represents, in sequence, the scene brightness from an intermediate far zone to an intermediate near zone. A signal processing means, responsive to the groups of photosignals and responsive to the process control signals, periodically energizes the light projecting means and produces N-1 intermediate zone determinations, whereby a final distance zone selection means selects a final subject distance zone from the intermediate zone determinations.

DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which like reference numerals are carried forward, and in which:

DESCRIPTION OF THE PREFERRED EMBODIMENT

Figure 1:
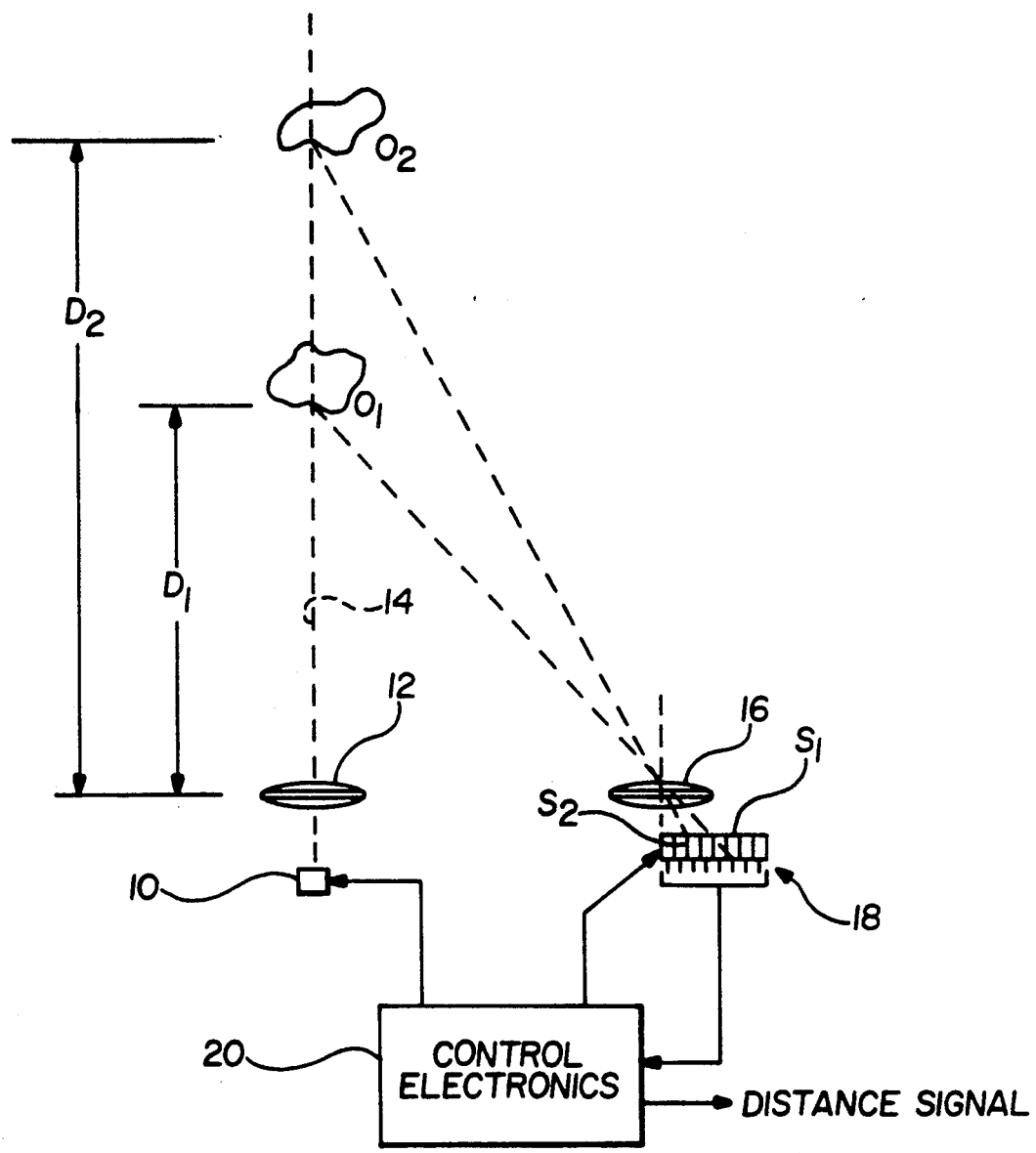
FIG. 1 is a schematic diagram of a rangefinder of the type to which the present invention pertains.
Figure 2:
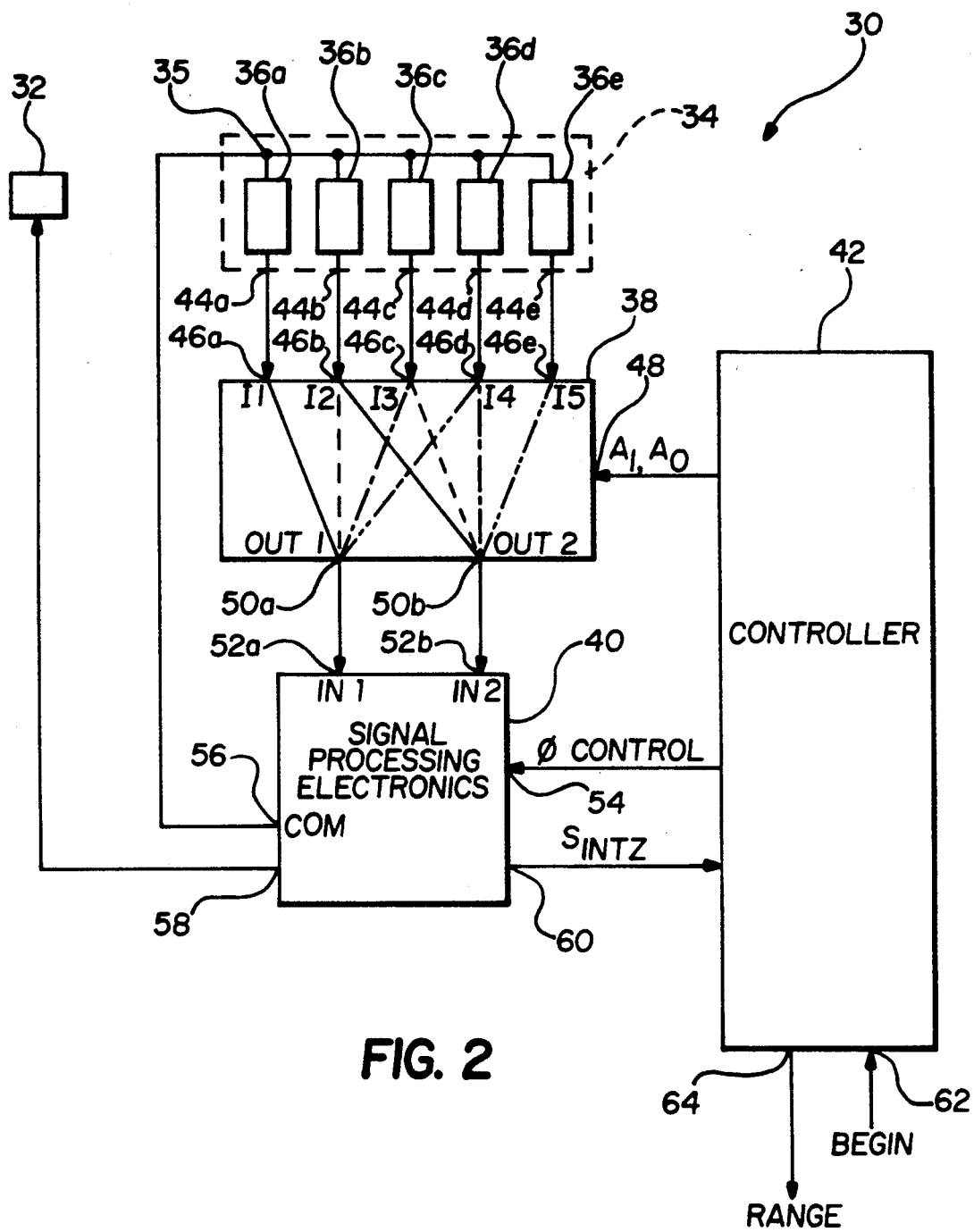
FIG. 2 is a schematic diagram of a preferred embodiment of the time-multiplexed rangefinder of the present invention.

Referring now to FIG. 2, a time-multiplexed multi-zone rangefinder 30 comprises an energizable means 32 and a linear array 34 of photosensitive elements 36. Rangefinder 30 further comprises analog multiplexer means 38, two-zone signal processing electronics 40, and controller 42. Energizable means 32 can comprise, for example, an infra-red emitting diode or IRED. When energized, energizable means 32 projects a beam of light to illuminate a spot on an object in a scene.

Photosensitive elements 36 of linear array 34 can comprise, for example, photodiodes. The N photosensitive elements, 36a thru 36e, produce N photosignals representing the brightness of the scene across N subject distance zones. Each photosensitive element 36 corresponds to one of the N subject distance zones, in sequence, from a FAR zone to a NEAR zone. That is, element 36a corresponds to the FAR zone, elements 36b to 36d correspond to three subject distance zones in sequential order between the FAR zone and the NEAR zone, and 36e corresponds to the NEAR zone. In FIG. 2, N equals five and is illustrative only. It is to be understood that N, the number of subject distance zones, can be any number greater than two.

One end of each photosensitive element 36 is connected in common at node 35. The output ends 44 of the photosensitive elements 36 carry photosignals indicative of the scene brightness and are connected, in parallel, to the inputs 46 of analog multiplexer means 38.

In addition to being connected to the output ends 44 of elements 36 at inputs 46, analog multiplexer means 38 comprises an address selection input 48 for receiving address selection signals. Analog multiplexer means 38 responds to address signals, $A_0$ and $A_1$, received on address input 48 to present selected pairs of analog inputs on the multiplexer outputs, 50a and 50b. Address signal $A_0$ is the least significant bit (LSB) and $A_1$ is the most significant bit (MSB). See table 1.

Analog multiplexer means 38 comprises, preferably, a custom integrated chip for performing analog multiplexing in response to address inputs as outlined in table 1. Custom integrated chip design and fabrication are well known in the art and therefore not discussed herein. Analog multiplexer means 38 can also be implemented using discrete analog multiplexer devices. As indicated above, multiplexer means 38 comprises analog inputs (46a thru 46e), address input (48), and outputs (50a and 50b). The five analog inputs 46 correspond to the N photosensitive elements 36. The address input 48 corresponds to selection lines for selecting groups or pairs of input photosignals. Similarly, the outputs 50 correspond to the number of input channels 52 of signal processing means 40.

TABLE 1

| SELECT | | OUTPUT | |
|---|---|---|---|
| A1 | A0 | OUT1 | OUT2 |
| LO | LO | I1 | I2 |
| LO | HI | I2 | I3 |
| HI | LO | I3 | I4 |
| HI | HI | I4 | I5 |

Multiplexer outputs 50 are connected to the intermediate FAR/NEAR channel inputs 52 of signal processing electronics 40. That is, output 50a is connected to FAR channel input 52a and output 50b is connected to NEAR channel input 52b.

Signal processing electronics 40 performs a two-zone intermediate zone triangulation ranging operation in response to a control signal, $\phi_{CONTROL}$, received at control input 54. Signal processing electronics 40 is connected in common with node 35 of photosensitive elements 36 at common input 56. Signal processing electronics 40 is further connected at output 58 to IRED 32 for periodically energizing IRED 32 during an intermediate zone ranging operation. Furthermore, processing electronics 40 provides an intermediate zone signal $S_{INTZ}$, indicative of an intermediate zone distance determination (on output 60) based upon photosignals received on inputs 52.

Signal processing electronics 40 can comprise, for example, a FAR/NEAR auto-focus integrated chip, number H2152, manufactured by Hamamatsu Photonics of Hamamatsu City, Japan. Processing electronics 40 utilizes an ambient background subtraction technique which operates to remove contributions of ambient scene illumination from the photosignals used in an intermediate zone triangulation ranging operation. Ambient background subtraction is described further in commonly assigned U.S. Pat. No. 4,490,037, incorporated herein by reference. It should be noted that the invention is not limited to two-zone processing electronics, but is broadly applicable to multiple-channel processing electronics, for example, three-zone FAR/-MID/NEAR intermediate zone processing electronics.

Rangefinder 30 is further provided with controller 42 which includes an input 62 for receiving a begin ranging signal, $S_{BEGIN}$. Signal $S_{BEGIN}$ can represent the state of a switch, for example, a shutter release switch in a camera application utilizing the rangefinder of the present invention.

Controller 42 is connected to input 48 of analog multiplexer 38 for supplying multiplexer 38 with time-multiplexed multi-zone ranging selection control signals, $A_0$ and $A_1$. Controller 42 is also connected to input 54 of signal processing electronics 40 for providing the control signal, $\phi_{CONTROL}$, thereto. Controller 42 is further connected to the output 60 of signal processing means 40 for receiving the intermediate zone determination signal, $S_{INTZ}$. Controller 42 selects a final subject distance zone from the intermediate zone determinations and outputs a final distance zone determination signal, $S_{RANGE}$, on output 64.

Controller 42 preferably comprises a custom integrated circuit chip for implementing the desired control for time-multiplexed multi-zone auto-ranging. Controller 42 can likewise comprise a microcomputer or discrete control circuitry. Custom integrated circuit design and programming of a microcomputer are well known in the art and therefore not discussed herein. Likewise, discrete control circuitry can be implemented via Programmable Array Logic (PAL), well known in the art, and therefore not discussed herein.

Figure 3:
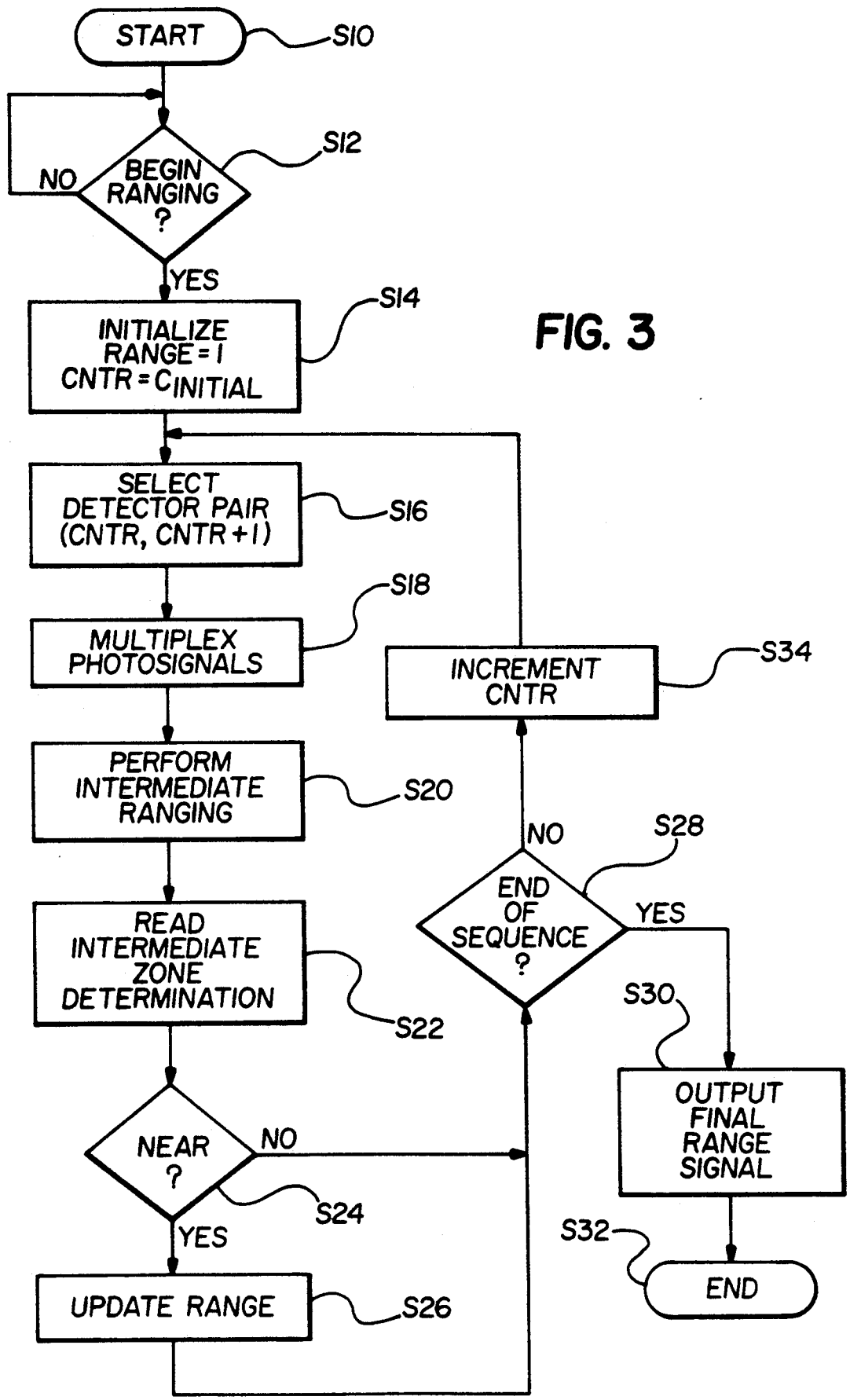
FIG. 3 is a flow chart indicating the sequence of the operation used in the present invention.

Making reference to FIGS. 2 and 3, rangefinder 30 operates as follows. Beginning with the start procedure S10 in FIG. 3, controller 42 repeatedly monitors the signal $S_{BEGIN}$ on input 62 for a begin ranging indication (step S12). As previously mentioned, the begin ranging indication can be represented by the closure of a shutter-release switch. Upon receipt and detection of the begin ranging indication, controller 42 initializes a multiplexing sequence at S14 (FIG. 3), initializing the final subject distance variable (RANGE=1) and a counter (CNTR=$C_{Initial}$). In the preferred embodiment, the value of $C_{Initial}$ is chosen to be 1 since the multiplexing sequence begins with the FAR zone end of linear array 34 and proceeds to the NEAR zone end. Distance variable RANGE is equal to 1 corresponds to the first photosensitive element 36a of linear array 34, which in turn represents a final subject distance FAR zone.

Upon completion of the initialization, controller 42 selects a first detector pair, CNTR and CNTR+1 (step S16). The first detector pair corresponds to first and second photosensitive elements 36a and 36b. Elements 36a and 36b in turn correspond to intermediate FAR zone and intermediate NEAR zone detectors, respectively, in the multiplexing sequence. Controller 42 then supplies selection signals to multiplexer means 38 so that the photosignals from the first detector pair are multiplexed and output by analog multiplexer means 38 (Step S18). Specifically, a logic low LO is supplied to input 48 for selection address signals $A_1$ and $A_0$. As a result, photosignals on inputs 46a (I1) and 46b (I2) are output on 50a (OUT 1) and 50b (OUT 2), respectively.

Controller 42 then sends a control signal, $\phi_{CONTROL}$, to signal processing electronics 40 for processing electronics 40 to perform a two-zone intermediate FAR/-NEAR zone ranging operation on the input photosignals (step S20). Signal processing electronics 40 then performs the intermediate zone ranging operation on the photosignals of the detector pair, 36a and 36b. The photosignal on FAR channel input 52a represents the brightness of the scene at the intermediate FAR zone and the photosignal on NEAR channel input 52b represents the brightness of the scene at the intermediate NEAR zone.

The intermediate zone ranging operation is a simple FAR/NEAR intermediate zone determination. The signal processing electronics 40 performs a ranging operation by first measuring and storing ambient scene illumination received by the intermediate FAR and NEAR channel photosensitive elements. Signal processing electronics 42 then energizes IRED 32 and measures the ambient scene illumination and IRED signal component of received photosignals while subtracting out the previously stored ambient scene illumination for each channel. In this way, signal processing electronics 40 obtains the IRED components of intermediate FAR and NEAR channel photosignals. Signal processing electronics 40 then performs a differential comparison of the IRED components of the FAR and NEAR channel photosignals to generate an intermediate zone determination. For example, if the IRED component of the intermediate FAR channel photosignal was greater than the intermediate NEAR channel, signal $S_{INTZ}$ would be a logic HI. If the opposite was true, signal $S_{INTZ}$ would be a logic LO. In the situation where the IRED components of the FAR and NEAR channel photosignals are relatively the same (i.e. too weak, or equal), signal processing means 40 outputs a FAR intermediate zone indication and signal $S_{INTZ}$ would be a logic HI.

The differential comparison of the IRED component of intermediate FAR and NEAR channel photosignals takes into account, automatically, any variations in signal levels due to variations in object reflectivity (versus amplitude comparison with a fixed reference voltage which cannot handle such variations in object reflectivity). Thus, the intermediate zone determination is immune from undesirable performance due to variations in object reflectivity.

Upon completion of an intermediate zone ranging operation, controller 42 (step S22) reads the intermediate zone determination information contained in signal $S_{INTZ}$. Controller 42 then determines whether or not a intermediate NEAR zone determination (Logic LO) has resulted (step 24). This involves a simple binary comparison. If an intermediate NEAR zone determination has resulted, control electronics 42 in step S26 stores the occurrence thereof by updating the final subject distance zone determination (RANGE) to equal the zone representative of the present count plus one (i.e. RANGE=CNTR+1). Controller 42 then proceeds to step 28. If no intermediate NEAR zone determination resulted, then controller 42 proceeds from step 24 to step 28, directly, and the final subject distance zone determination is not updated.

Controller 42 then makes a determination of whether or not the end of the multiplexing sequence has been reached (step 28). That is, have all pairs of photosensitive elements (CNTR, CNTR+1) been time-multiplexed across two-zone signal processing electronics 40 for intermediate zone determinations. In other words, does (CNTR+1) equal N, where N is the number of detector elements 36 in array 34? If so, the final subject distance zone determination is output in signal $S_{RANGE}$ on output 64 (step S30), the final zone determination being contained in the final subject distance variable RANGE. Ranging of rangefinder 30 is then ended at step 32.

In the preferred embodiment, RANGE is representative of the last occurrence of an intermediate NEAR zone determination from the time-multiplexed series of intermediate zone determinations. This is often desirable in a camera application. It should be noted that the final subject distance selection may also comprise selecting a desired one of several occurrences of intermediate NEAR zone determinations in a ranging operation according to the design requirements of a particular rangefinder. The occurrence of several intermediate NEAR zone determinations indicates multiple subjects at various distances (short of a FAR zone) being illuminated with a portion of the projected light beam.

On the other hand, if not all detector pairs (CNTR, CNTR+1) have been time-multiplexed across signal processing electronics 42, controller 42 at Step S34 increments counter CNTR by 1 (i.e., CNTR=CNTR+1) and proceeds by selecting the next detector pair (CNTR, CNTR+1) at step S16. The process repeats itself until the multiplexing sequence is completed.

In continuation of the above example, upon completion of the first intermediate zone determination of photosignals from first detector pair 36a and 36b, controller 42 performs steps S24 thru S26 in the manner previously described. Since the multiplexing sequence has not ended, as determined in Step 26, controller 42 then supplies analog multiplexer means 38 at input 48 with a logic HI and LO on selection signals $A_0$ and $A_1$, respectively, for selecting photosignals from a second detector pair, 36b and 36c (Step S16). The photosignals from 36b and 36c are then input via multiplexer 38 into intermediate FAR and NEAR channel inputs, 52a and 52b, respectively of signal processing means 40 (Step 18). Controller 42 then provides a control signal, $\phi_{CONTROL}$, to processing electronics 40, as previously discussed, for effectuating an intermediate zone ranging operation on the photosignals of detector pair 36b and 36c (Step S20). The time-multiplexed sequence comprises the process of selecting detector pairs across the array 34 of detectors 36 in time-multiplexed order, from FAR to NEAR until all adjacent pairs have been selected. The selected pairs, as shown in FIG. 2, comprise, in order, first and second detectors (36a, 36b), second and third detectors (36b, 36c), third and fourth detectors (36c, 36d), and fourth and fifth detectors (36d, 36e).

By employing time-multiplexed ranging of two-zone (FAR/NEAR) processing electronics, the present invention avoids the need for expensive Charge Coupled Devices (CCDs) while providing low cost, reflectivity insensitive, multiple-zone detection capability.

Figure 4:
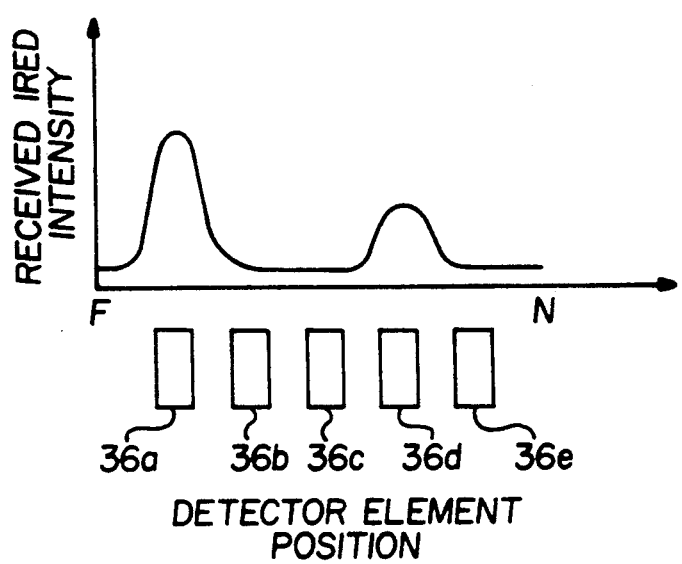
FIG. 4 is a graph showing a light intensity distribution on an array of detector elements.

A distribution of received IRED intensity versus detector element position, as shown in FIG. 4, would occur in a ranging situation in which a near subject having low reflectivity is in front of a far, highly reflective object and a portion of the IRED spot falls on each. Rangefinder 30 would perform the intermediate FAR/NEAR zone determinations on photosignals of adjacent detector pairs, in order, beginning with the detector pair corresponding to the FAR subject distance zone end of array 34.

The intermediate zone determination for each detector pair would be: first detector pair (36a, 36b)—FAR; second detector pair (36b, 36c)—FAR; third detector pair (36c, 36d)—NEAR; and the fourth detector pair (36d, 36e)—FAR. Controller 42 selects from the results of intermediate zone determinations, a last occurrence of a NEAR indication to be the final distance zone. This is to be distinguished from selecting the occurrence of the maximum received IRED signal by a photosensitive element as would be selected by a peak detecting system. In this instance, the last occurrence of a NEAR determination occurred with respect to detector pair (36c, 36d), indicating that detector 36d received more IRED signal than detector 36c. Thus, the final subject distance zone is that zone corresponding to detector 36d (i.e., RANGE=4).

It should be noted that the invention is not limited to selecting pairs adjacent detectors, but is broadly applicable to selecting pairs of non-adjacent detectors, for example, (36a, 36c), (36b, 36d), and (36c, 36e).

It should further be noted that while the invention has been described with reference to a multiplexing sequence beginning at the FAR zone end of photosensitive element array 34, the invention is equally applicable to a multiplexing sequence beginning at the NEAR zone end of array 34, making appropriate changes to the control sequence algorithm.

Accordingly, it has been shown that the time-multiplexed rangefinder provides a low cost, reflectivity insensitive multi-zone rangefinder. Duplicate ranging circuitry is eliminated by time-multiplexing photosignals of detector pairs, in an order from FAR to NEAR, across two-zone signal processing electronics. Furthermore, the signal processing electronics provides a simple binary FAR/NEAR intermediate zone determination for use and interpretation by the controller.

While the invention has been described with reference to the preferred embodiment, it will be appreciated that variations and modifications can be effected within the scope of the invention. For example, in the situation of rangefinder 30 employing three-zone processing electronics, groups of photosignals are selected as inputs for performing intermediate FAR/MID/NEAR zone ranging operations. The multiplexing sequence would comprise multiplexing groups of photosignals.

What is claimed is:

1. A rangefinder that receives light reflected from one or more objects in a scene and produces a distance measurement to one of the objects, the rangefinder comprising:
   (a) a light source that produces a beam of light when energized and illuminates the objects in the scene;
   (b) a plurality of photosensitive elements that produce corresponding output photosignals representative of the brightness of the scene and of respective distance zones;
   (c) multiplexer means for receiving the output photosignals and producing selected groups of the output photosignals, each selected group of photosignals comprising a sequence of photosignals received from a first distance zone to subsequently nearer distance zones;
   (d) signal processing means for
      (1) receiving the selected group of output photosignals from the multiplexer means when the light source is not energized, comprising an ambient light scene, and receiving the selected group of output photosignals when the light source is energized, comprising an illuminated scene,
      (2) subtracting each respective ambient light scene output photosignal from each corresponding illuminated scene output photosignal, and (3) producing an intermediate zone determination indicative of which output photosignal of a subtracted photosignal group is less than the others; and (e) a controller that periodically energizes the light source and selects, as the distance to the closest object, the distance zone corresponding to the last intermediate zone determination for which the signal processing means indicates that the output photosignal from the farthest distance zone of the photosignal group was less than the others.

2. A rangefinder as defined in claim 1, wherein the groups of output photosignals comprise photosignals from adjacent distance zones.

3. A rangefinder that receives light reflected from one or more objects in a scene and produces a distance measurement to one of the objects, the rangefinder comprising:

(a) a light source that produces a beam of light when energized and illuminates a spot on the objects in the scene;

(b) a linear array of N photosensitive elements that produce N output photosignals representing the brightness of the scene and corresponding to N respective distance zones;

(c) analog multiplexer means for receiving the output photosignals and producing selected pairs of the output photosignals, a first selected photosignal of a pair corresponding to the brightness signal from a first distance zone and a second selected photosignal of a pair corresponding to the brightness signal from a second, next nearest distance zone;

(d) signal processing means for
  (1) receiving the selected group of output photosignals from the analog multiplexer means when the light source is not energized, comprising an ambient light scene, and receiving the selected pairs of output photosignals when the light source is energized, comprising an illuminated scene,
  (2) subtracting each respective ambient light scene output photosignal from each corresponding illuminated scene output photosignal, and
  (3) producing N-1 intermediate zone determinations that indicate which output photosignal of a subtracted photosignal pair is less than the other; and (e) a controller that periodically energizes the light source and selects, as the distance to the closest object, the distance zone corresponding to the last intermediate zone determination for which the signal processing means indicates that the first output photosignal of an output pair was less than the second output photosignal of an output pair.

* * * * *